US012561275B1

(12) United States Patent
Milicevic et al.

(10) Patent No.: US 12,561,275 B1
(45) Date of Patent: Feb. 24, 2026

(54) RECONFIGURABLE STREAMING PROCESSOR FOR SECURITY COMPUTATIONS

(71) Applicant: MARVELL ASIA PTE LTD, Singapore (SG)

(72) Inventors: Vladimir Milicevic, Guelph (CA); Timothy Webster, Kanata (CA)

(73) Assignee: Marvell Asia Pte Ltd, Singapore (SG)

( * ) Notice: Subject to any disclaimer, the term of this patent is extended or adjusted under 35 U.S.C. 154(b) by 112 days.

(21) Appl. No.: 18/436,058

(22) Filed: Feb. 8, 2024

Related U.S. Application Data

(60) Provisional application No. 63/607,542, filed on Dec. 7, 2023, provisional application No. 63/444,546, filed on Feb. 9, 2023.

(51) Int. Cl.
*G06F 15/173* (2006.01)
*H04Q 3/00* (2006.01)

(52) U.S. Cl.
CPC ..... *G06F 15/17381* (2013.01); *H04Q 3/0004* (2013.01)

(58) Field of Classification Search
CPC ........................ G06F 15/17381; H04Q 3/0004
USPC ......................................................... 713/190
See application file for complete search history.

(56) References Cited

U.S. PATENT DOCUMENTS

2008/0309370 A1 * 12/2008 Spangaro ............. H10D 84/907
326/38
2009/0111413 A1 * 4/2009 Luschi ................. H04B 1/0003
455/230

OTHER PUBLICATIONS techterms.com, Control Unit, pp. 1-2, (Oct. 21, 2020)(available at https://techterms.com/definition/control_unit) (Year: 2020).*
Tencent Cloud, What is a Compute Unit?, pp. 1-3 (Apr. 18, 2025)(available at https://www.tencentcloud.com/techpedia/106191) (Year: 2025).*
Microsoft Computer Dictionary 131 (5th ed. 2002) (Year: 2002).*
IEEE Std. 802.1AE™-2018, "IEEE Standard for Local and Metropolitan Area Networks—Media Access Control (MAC) Security," IEEE Computer Society, pp. 1-239, year 2018.

* cited by examiner

*Primary Examiner* — David P Zarka
(74) *Attorney, Agent, or Firm* — Meitar Patents Ltd.; Daniel Kligler

(57) ABSTRACT

A computing system includes a streaming engine and a graph core. The streaming engine includes an array of compute units (CUs), an array of crossbar switches, and a configurable interconnect circuit. The CUs perform logical operations on operands. The crossbar switches forward outputs of one or more CUs to inputs of one or more neighboring CUs. The configurable interconnect circuit forwards an output of at least one of the CUs to an input of at least one of the crossbar switches. The graph core programs the streaming processor to perform a security computation by selectively configuring the CUs to perform a plurality of respective logical operations in a programmable order to define a flow of logical operations to be performed by the CUs that effects the security computation, and configuring the crossbar switches and the interconnect circuit to perform the logical operations by traversing the CUs according to the flow.

16 Claims, 7 Drawing Sheets

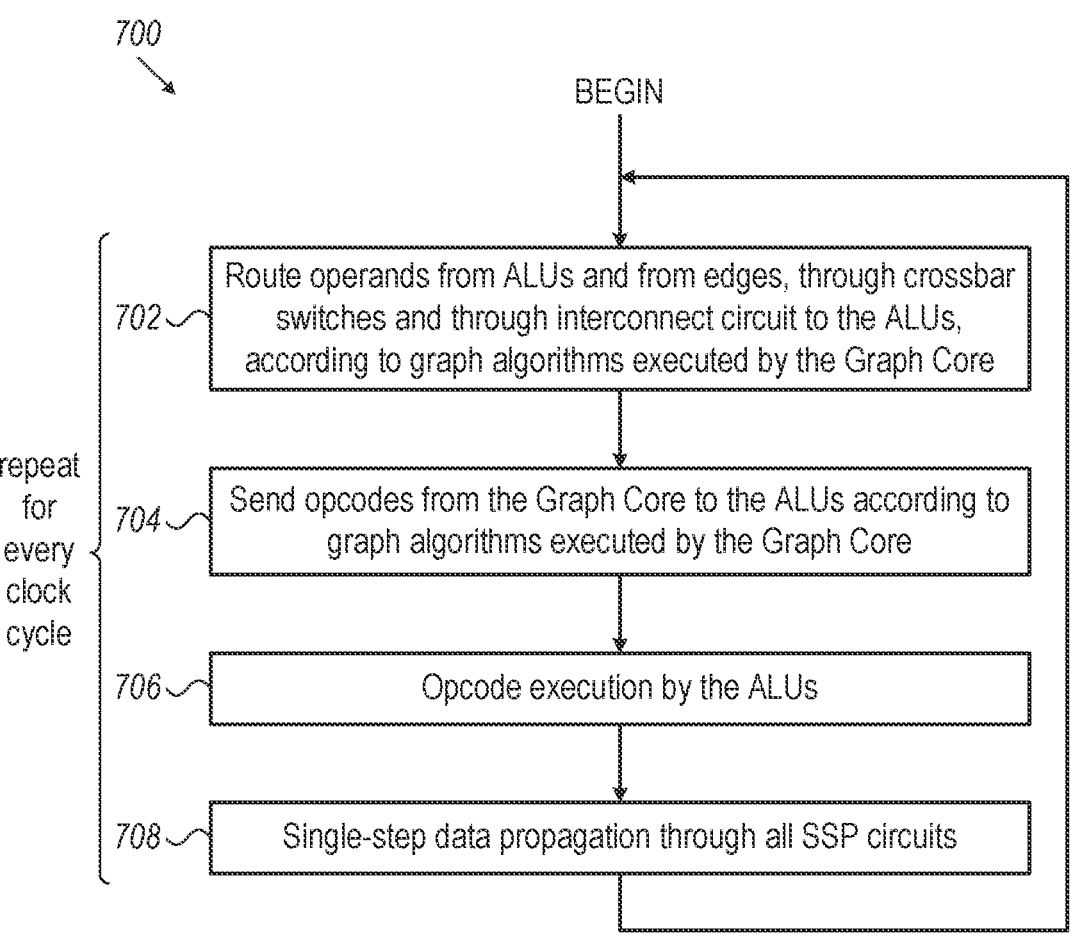

*700*

BEGIN

702 — Route operands from ALUs and from edges, through crossbar switches and through interconnect circuit to the ALUs, according to graph algorithms executed by the Graph Core 704 — Send opcodes from the Graph Core to the ALUs according to graph algorithms executed by the Graph Core 706 — Opcode execution by the ALUs 708 — Single-step data propagation through all SSP circuits repeat for every clock cycle

*FIG. 7*

RECONFIGURABLE STREAMING PROCESSOR FOR SECURITY COMPUTATIONS

CROSS-REFERENCE TO RELATED APPLICATIONS

This application claims the benefit of U.S. Provisional Patent Application 63/444,546, filed Feb. 9, 2023, and U.S. Provisional Patent Application 63/607,542, filed Dec. 7, 2023, whose disclosures are incorporated herein by reference.

FIELD OF THE DISCLOSURE

The present disclosure relates generally to processors, and particularly to a streaming processor for security computations.

BACKGROUND

Security related computations, such as cryptographic encryption/decryption and authentication, require increasing amounts of computational power. Examples of such computations include Rivest-Shamir-Adleman (RSA) asymmetric encryption, Twofish symmetric block cipher algorithm, Advanced Encryption Standard (AES), Elliptic-curve public-key cryptography, Triple Data Encryption Standard (TripleDES), HMAC hash message authentication code and many others.

The security related computations typically involve large numbers, bit shuffling, modulo arithmetic, polynomial calculations, and other arithmetic computations.

SUMMARY

An embodiment that is described herein provides a computing system including a streaming engine and a graph core. The streaming engine includes an array of compute units (CUs), an array of crossbar switches in communication with the CUs, and a configurable interconnect circuit. The CUs are configured to perform logical operations on operands. The crossbar switches are configured to forward outputs of one or more CUs to inputs of one or more neighboring CUs. The configurable interconnect circuit is configured to forward an output of at least one of the CUs to an input of at least one of the crossbar switches. The graph core is configured to program the streaming processor to perform a security computation by (i) selectively configuring the CUs to perform a plurality of respective logical operations in a programmable order to define a flow of logical operations to be performed by the CUs that effects the security computation, and (ii) configuring the crossbar switches and the interconnect circuit to perform the logical operations by traversing the CUs according to the flow.

In some embodiments, subsequent to being programmed by the graph core, the streaming processor is configured to execute multiple instances of the security computation in a pipeline on multiple respective input data.

In some embodiments, the CUs are grouped in tiles, each tile including a respective subset of the CUs and a respective subset of the crossbar switches. In a disclosed embodiment, a given tile includes circuitry configured to forward a given input, received via the interconnect circuit, to a given crossbar switch in the given tile.

In some embodiments, the graph core includes an array of interconnected graph decision circuits, a given graph decision circuit including a High-Radix switch. In an example embodiment, a given graph decision circuit further includes a digital comparator configured to compare two or more outputs of the High-Radix switch to one another.

In some embodiments, the graph core is configured to divide the security computation into multiple computational tasks, to define a flow of data between the computational tasks, and to map the computation tasks to at least some of the CUs. In an embodiment, the graph core is configured to map the computational tasks to the CUs in accordance with a space-filling curve.

There is additionally provided, in accordance with an embodiment that is described herein, a computing method including performing logical operations on operands using a streaming engine including an array of compute units (CUs). Using an array of crossbar switches in communication with the CUs, outputs of one or more CUs are forwarded to inputs of one or more neighboring CUs. Using a configurable interconnect circuit, an output of at least one of the CUs is forwarded to an input of at least one of the crossbar switches. Using a graph core, the streaming engine, the array of crossbar switches and the interconnect circuit are programmed to perform a security computation by (i) selectively configuring the CUs to perform a plurality of respective logical operations in a programmable order to define a flow of logical operations to be performed by the CUs that effects the security computation, and (ii) configuring the crossbar switches and the interconnect circuit to perform the logical operations by traversing the CUs according to the flow.

There is further provided, in accordance with an embodiment that is described herein, a graph processor including an array of interconnected graph decision circuits. Each graph decision circuit includes a High-Radix switch. In some embodiments, a given decision circuit further includes a digital comparator configured to compare two or more outputs of the High-Radix switch to one another, or to compare one or more outputs of the High-Radix switch to a constant.

The present disclosure will be more fully understood from the following detailed description of the embodiments thereof, taken together with the drawings in which:

BRIEF DESCRIPTION OF THE DRAWINGS

FIG. 7 is a flowchart that schematically illustrates a method for streamlined processing of security functions, in accordance with an embodiment that is disclosed herein.

DETAILED DESCRIPTION OF EMBODIMENTS

Figure 1:
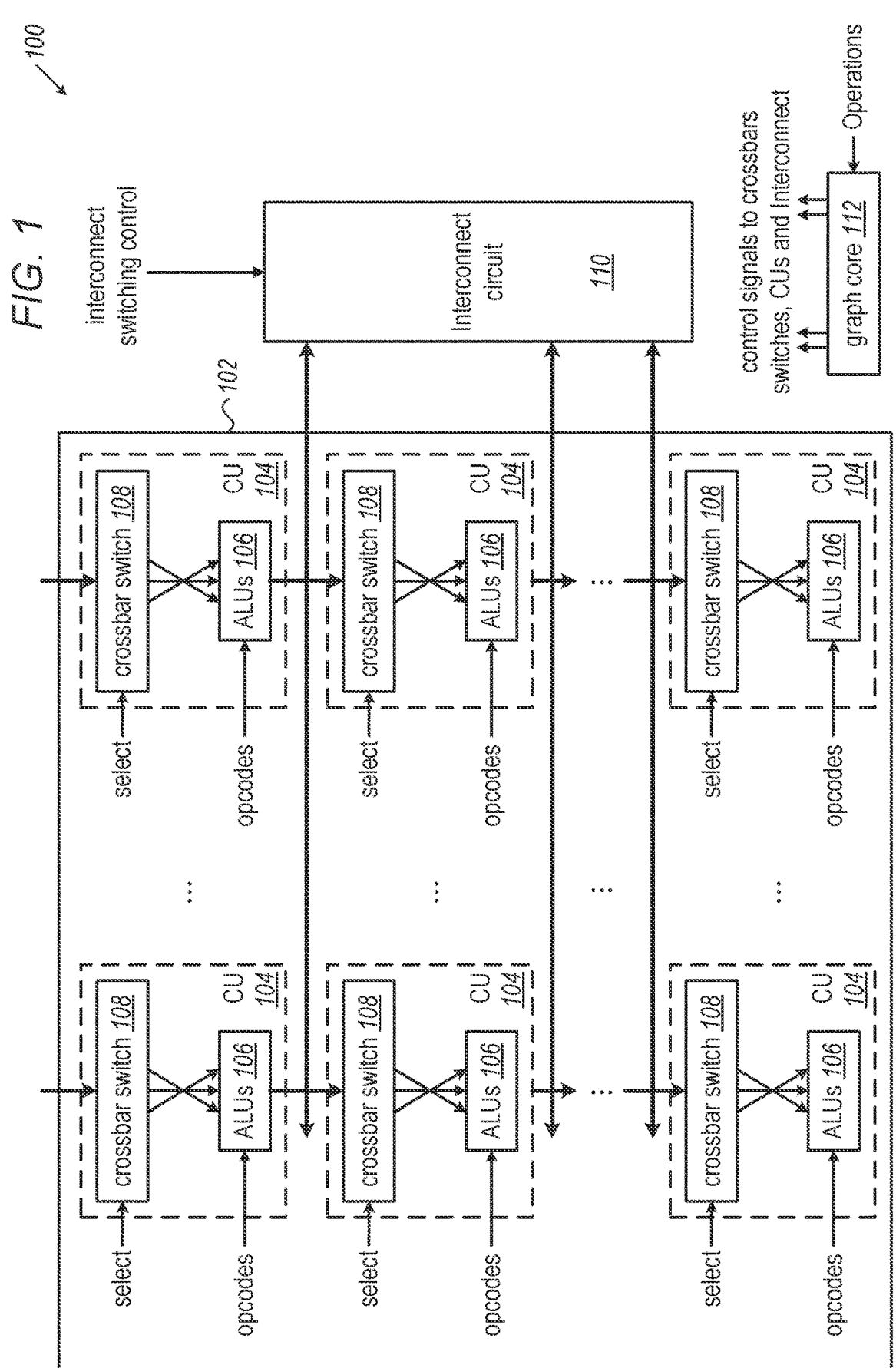
FIG. 1 is a block diagram that schematically illustrates a Streaming Security Processor (SSP), in accordance with an embodiment that is described herein.

As cyber threats become increasingly sophisticated and pervasive, streamlined and rapid security computations are paramount to safeguarding sensitive information, ensuring the integrity of systems, and mitigating the potential adverse consequences of security breaches.

Embodiments that are described herein provide for circuits and methods that efficiently execute continuous streams of security computations. In embodiments, a Streaming Security Processor (SSP) comprises a Streaming Engine (SE), an Interconnect Circuit and a Graph Core. The SE comprises a two-dimensional matrix of Compute Units (CUs), each CU comprising one or more Crossbar Switches and one or more Arithmetic Logic Units (ALUs). In some embodiments, the ALUs are configured to execute bit-wise logic operations, according to input opcodes, on two input operands. The Crossbar switches allow for efficient and dense data communication between neighboring CUs, whereas the Interconnect circuit allows for flexible (albeit typically slower) inter-CU communication from any CU to any other CU.

The Graph-Core comprises a plurality of decision circuits, each decision circuit comprising a switch with multiple inputs (e.g., 32 or more, referred to as "high radix switch" below) and a comparator. The Graph-Core runs graph algorithms that determine efficient allocation of security tasks and of operands to CUs, send suitable opcodes to the ALUs, and send control signals to the crossbar switches and the interconnect circuit. In an embodiment, the Graph-Core may run tessellation algorithms, to efficiently fill the matrix of CUs.

In embodiments, Graph is a finite set of nodes and lines that connect some or all of the nodes (the nodes and lines are also called, respectively, vertices and edges). A Graph algorithm is a set of instructions that traverses nodes of a graph.

An example graph algorithm that may be used in some embodiments is Dijkstra's graph search algorithm, which finds the shortest path between two nodes in a graph. It is an iterative algorithm that starts with the source node and works its way to the destination node. For each new node discovered, Dijkstra's algorithm calculates the shortest path to the destination node using the currently known distances. When traversing using Dijkstra's algorithm, any node in the graph can be considered the root node.

In other embodiments, the Minimum Spanning Tree graph algorithm may be used. The Minimum Spanning Tree algorithm entails connecting all vertices with the fewest total edge weights. In other words, it is a spanning tree that has the lowest possible sum of edge weights. Note that additional circuits, like adders and accumulators, may be added to the decision circuits of the Graph Core.

In some embodiments that are disclosed herein, a security accelerator of a processor (e.g., Network on a Chip (NoC), and interconnection networks) comprises a plurality of SSPs that provide security computations to various subsystems of the processor; the SSPs may vary in size (e.g., number of CUs) according to the varying requirements of the subsystems.

Streaming Security Processors according to embodiments that are described herein facilitate efficient streamlined execution of a variety of security computation; many security-related computations include bit-wise calculations that do not require carry propagation and, hence, can be executed in parallel by a group of compute units with most data shuffling done within the compute units, or between neighboring compute units.

FIG. 1 is a block diagram that schematically illustrates a Streaming Security Processor (SSP) 100 in accordance with an embodiment that is described herein. SSP 100 comprises a Streaming Engine (SE) 102, which, in turn, comprises an array of Compute Units (CUs) 104 that are arranged in a two-dimensional X-Y matrix, in an embodiment. Each CU 104 is tightly connected to its neighbors; according to the example embodiment illustrated in FIG. 1, each CU directly receives the output of a CU that is positioned "above" the receiving CU (the choice of directions—up, down, right or left is arbitrary); in other embodiments, CUs may alternatively, or additionally, receive outputs from CUs that are located to the left of the receiving CU, and, in some embodiments, diagonal connections are also provided.

Each CU 104 comprises a group of Arithmetic Logic Units (ALU) 106, and a crossbar switch 108. The crossbar switch routes outputs from a neighboring CU responsively to a Select input, to the operand inputs of ALUs 106. The ALUs are configured to perform a selected logical/mathematical operation, responsively to an opcode input, on the operand inputs, and to send the result to one or more other CUs.

ALUs 106 typically comprise four 8-bit ALUs. In some embodiments, to better fit cryptographic applications, ALUs 106 are configured to perform logic operations only (e.g., bit-wise OR, AND, XOR, etc.) and do not perform arithmetic operations (e.g., add) (and, hence, ALUs 106 are, in effect, LUs—Logic Units). In other embodiments, however, some or all of ALUs 106 may be configured to perform other bit-wise two-bit operations. In an embodiment, any or all possible sixteen bit-wise two-input functions can be used, according to the form:

$$OUT = C0 * \sim a * \sim b + C1 * \sim a * b + C2 * a * \sim b + C3 * a * b$$

Where each of C0, C1, C2 and C3 can be a logic-0 or logic-1, a and b are the inputs, ~, * and + represent logic negation, AND and OR, respectively; for example, C0=0, C1=1, C2=1, C3=0 defines a XOR function: OUT=a XOR b, whereas C0=0, C1=1, C2=1, C3=1 defines an OR function: OUT=a OR B.

In some embodiments, crossbar switches 108 are configured to perform bit-level switching; the Select input defines the selection in terms of bits, e.g., route bit 3 of a first input word to bit 2 of a second ALU in ALUs 106; in an embodiment, the crossbar switch facilitates unary operations, e.g., power-of-two multiplication can be achieved by the logical shifting of an input.

In an embodiment, highly efficient communication takes place between neighboring CUs, and, with proper algorithms, most inter-CU communication can be confined to CUs that are in proximity. However, in some embodiments, communication between non-proximal CUs may also be required. Towards that end, SSP 100 further comprises an interconnect circuit 110, which is configured to facilitate communication between any two CUs in SE 102. In embodiments, Interconnect 110 may comprise an all-to-all crossbar switch. In other embodiments, Interconnect 110 comprises a hierarchical switching network, and in yet other embodiments other switching techniques may be used. While communication between neighboring CUs typically takes one clock cycle, communication through the Interconnect may take longer.

For efficient allocation of variables and tasks to CUs, as well as for the programming of the crossbar select inputs, the ALU opcode inputs and the interconnect switch-control input, SSP 100 further comprises a Graph Core 112, which is configured to efficiently execute a variety of graph algorithms.

Thus, in embodiments, the SSP is configured to execute security computations in a streaming manner, in a plurality of tightly coupled CUs, wherein a high efficiency graph core runs graph algorithms to efficiently allocate data and tasks to CUs, to program the CUs and to program an interconnect circuit for data transfers between remote CUs.

The configuration of SSP 100 illustrated in FIG. 1 and described hereinabove is cited by way of example. Other configurations may be used in alternative embodiments. For example, in some embodiments, the SSP comprises a plurality of interconnected SEs. In other embodiments, some or all the CUs may comprise a local memory. In an embodiment, the CUs comprise unary operations (e.g., copy).

Figure 2:
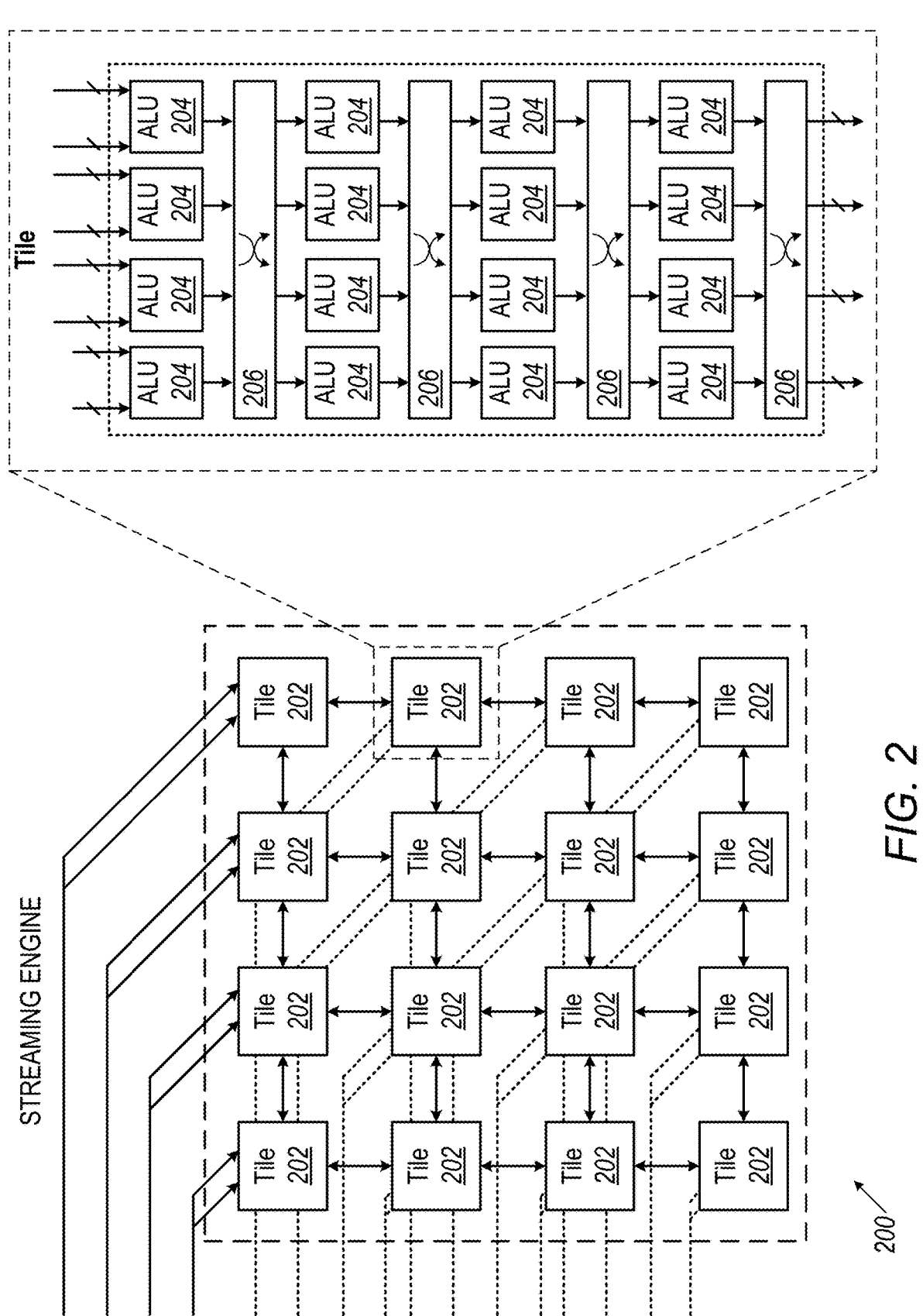
FIG. 2 is a block diagram that schematically illustrates a Streaming Engine (SE) in the SSP of FIG. 1, in accordance with an embodiment that is described herein.

FIG. 2 is a block diagram that schematically illustrates a Streaming Engine (SE) 200 in accordance with an embodiment that is described herein. The configuration of SE 200 can be used, for example, to implement SE 102 of FIG. 1 above. In the present embodiment, SE 200 is hierarchical, and comprises a matrix of Tiles 202, wherein each tile is tightly coupled to its vertical, horizontal and diagonal neighbors (connection to the diagonal neighbors is indicated by a dashed line).

Each tile comprises four vertical layers, in an embodiment, and each layer comprises four 8-bit ALUs 204 that are coupled to a crossbar switch 206. SE 200 further comprises connections (not shown) between crossbar switches through interconnect circuit 110 (FIG. 1). In some embodiments, to reduce complexity albeit at a slight cost in performance, the interconnect network is connected only to the edges of the tiles.

The configuration of SE 200 illustrated in FIG. 2 and described hereinabove is an example configuration cited for the sake of conceptual clarity. Other configurations may be used in alternative embodiments. In some embodiments, for example, more hierarchy levels are used, e.g., tile-groups that comprise tiles.

In embodiments, efficient allocation of operands to CUs, as well as efficient control of the ALU opcodes, of the crossbar select inputs and of the interconnect switching control are determined using graph algorithms, and, as the allocations and controls may change frequently (e.g., once per clock cycle), streaming graph algorithms, in which a continuous stream of graph algorithms are invoked and executed in a pipelined manner, are employed.

Figure 3:
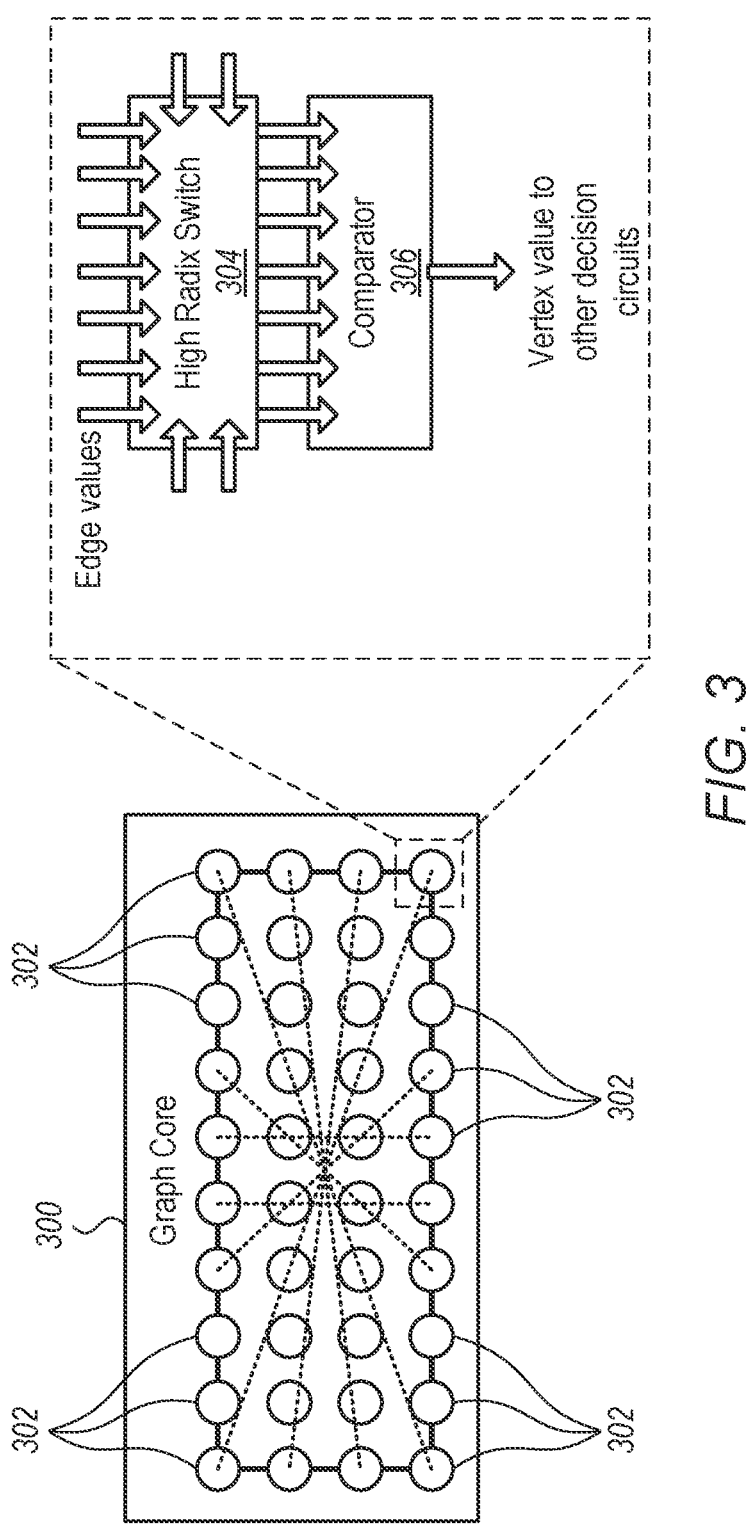
FIG. 3 is a block diagram that schematically illustrates a streaming graph decision circuit, in accordance with an embodiment that is disclosed herein.

FIG. 3 is a block diagram that schematically illustrates a streaming graph decision circuit (also referred to as Graph Core below) 300, in accordance with an embodiment that is disclosed herein. Graph Core 300 is configured to efficiently execute common graph algorithms, in which repetitive branches are taken responsively to comparison results. The Graph Core comprises a plurality of interconnected decision circuits 302 (the number of decision circuits is typically linked to the number of CUs; in an example embodiment, 1024 CUs and 128 decision circuits may be used; in other example embodiments, any other suitable number of decision circuits are used).

Each decision circuit 302 comprises a high-radix switch 304, which is configured to select outputs from a plurality of other decision circuits and route the selected outputs to a comparator 306. The comparison result is input to a selector, which is configured to select an input according to the comparison result, and forward the output (referred to as Vertex Value") to other decision circuits.

Figure 4:
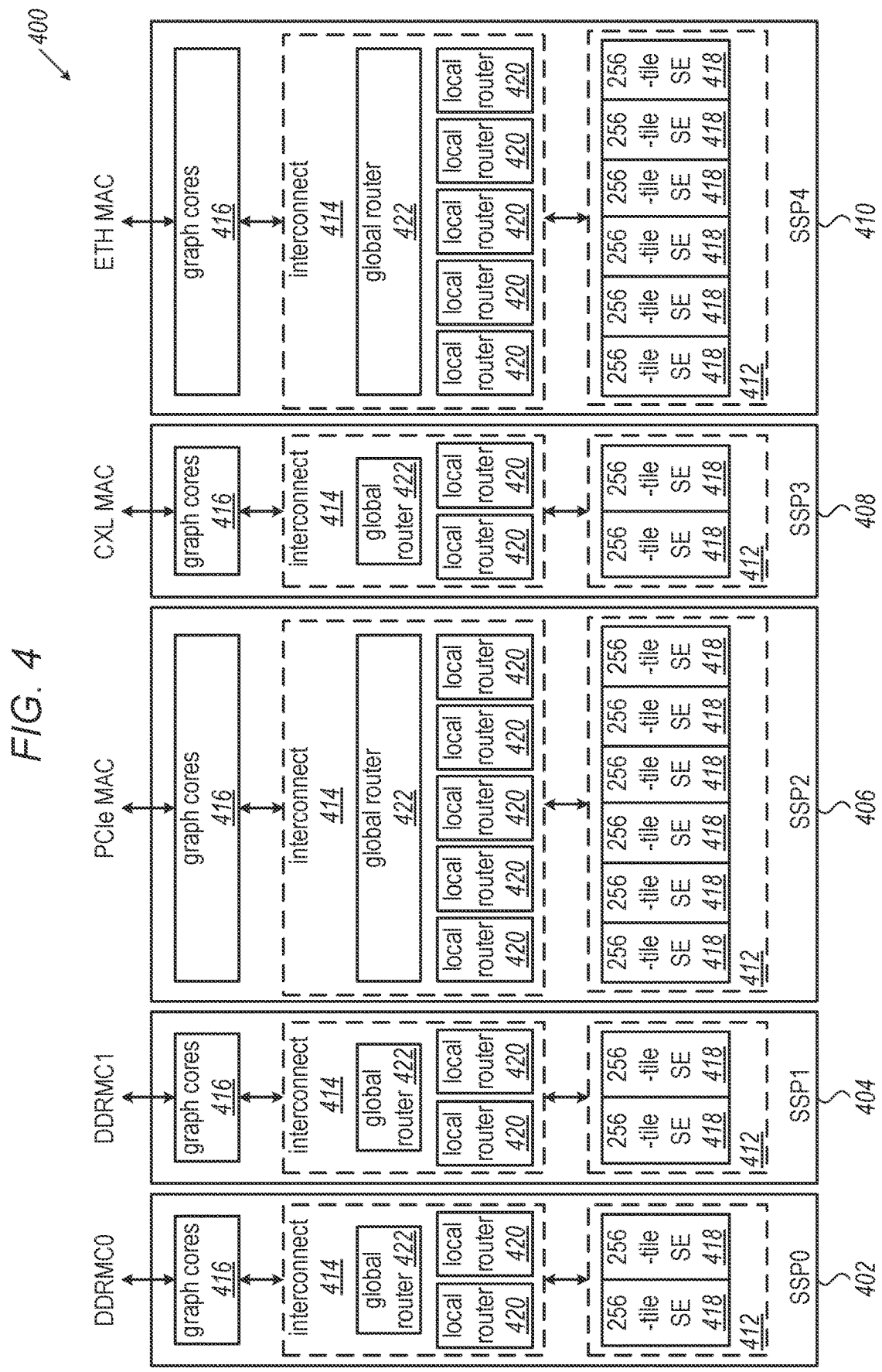
FIG. 4 is a block diagram that schematically illustrates a Network-on-a-Chip (NoC) security extension, in accordance with an embodiment that is disclosed herein.

FIG. 4 is a block diagram that schematically illustrates a Network-on-a-Chip (NoC) security extension 400, in accordance with an embodiment that is disclosed herein. NoC extension 400 interfaces with a first Double-Data-Rate (DDR) Random Access Memory (RAM) (designated DDRMC0, or DDR Memory Controller 0), a second DDR-RAM (designated DDRMC1, or DDR Memory Controller 1), a Peripheral Component Interconnect Express Medium Access Control (PCIe-MAC), a Compute Express Link Medium Access Control (CXL-MAC) and an Ethernet Medium Access Control (ETH-MAC). (The corresponding circuits that the NoC interfaces with are not shown.)

According to the embodiment illustrated in FIG. 4, an SSP is assigned for each of the interfaces: an SSP0 402 executes the security functions of the DDR-MC0 interface, an SSP1 404 executes the security functions of the DDR-MC1 interface, an SSP2 406 executes the security functions of the PCIe-MAC interface, an SSP3 408 executes the security functions of the CXL-MAC interface, and, an SSP4 410 executes the security functions of the ETH-MAC interface. Each of SSP0, SSP1, SSP2, SSP3 and SSP4 comprises a streaming-engine cluster (e.g., an aggregation of multiple SEs) 412, a two-level hierarchical Interconnect Circuit 414, and Graph-Cores 416.

In some embodiments, some or all the compute resources SE 418 may be shared between the various interfaces. In an embodiment, a large pool of SEs connected to a single interconnect circuit may allocate resources to interfaces, per need. In an embodiment, such allocation may be dynamic according to varying security needs of the interfaces.

According to the example embodiment illustrated in FIG. 4, the security tasks associated with the five interfaces vary in complexity and, for better area and power utilization, different-sized SSPs are assigned to the interfaces. Thus, each of the streaming-engine clusters 412 of SSP0 402, SSP1 404 and SSP3 408 comprise two 256-tile SEs, whereas the streaming-engine clusters of SSP2 406 and SSP4 410 comprise six 256-tile SEs each.

Similarly, each of the interconnect circuits 414 of SSP0, SSP1 and SSP3 comprises two local routers 420 at a bottom hierarchy level and a single global router 422 at the top hierarchy level, whereas each of the interconnect circuits of SSP2, SSP4 comprises five bottom-level local routers 420 and a single top-level global router 422. Lastly, Graph Cores 416 of the five SSPs may differ in size; for example, each graph core may include a different number of decision circuits and, in embodiments, different sizes of operands.

The configuration of NoC extension 400 illustrated in FIG. 4 and described hereinabove is an example configuration that is cited merely for the sake of conceptual clarity. In particular, in various embodiments, all numbers quoted above, including the number of SEs in each SSP, the number of tiles in each SE and the number of local and global routers, may vary considerably. In some embodiments, there is no hierarchy in some or all interconnect circuits 414; in other embodiments, some, or all of interconnect circuits 414 may have more than two hierarchy levels (increased router hierarchy depth improves the network performance, and may improve network capacity, thereby allowing the graph cores to have more time to run graph algorithms and generate the necessary control signals, or improve the physical design by reducing the congestion between adjacent router layers within the interconnection hierarchy. In some embodiments, however, local routers 420 are not required, (e.g., when there is a single SE) and the interconnect circuit may be flat).

Figure 5:
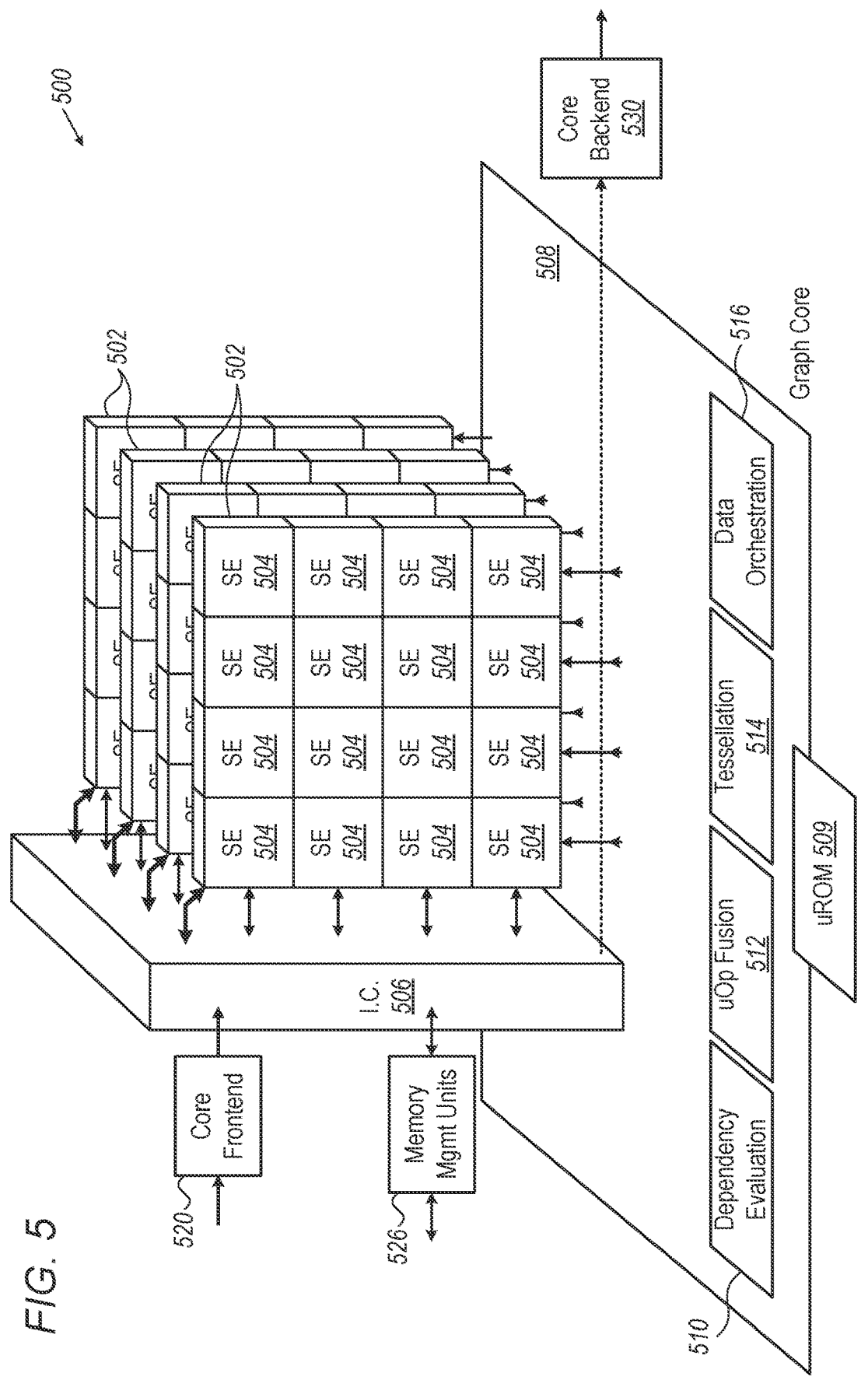
FIG. 5 is a block diagram that schematically illustrates a Processor Security Extension, in accordance with an embodiment that is disclosed herein.

FIG. 5 is a block diagram that schematically illustrates a Processor Security Extension 500, in accordance with an embodiment that is disclosed herein. Processor Security Extension 500 provides security computations for a processor that is not shown. The Processor Security Extension comprises four SE groups 502, each SE groups comprising a 4×4 matrix of SEs 504; an Interconnect Circuit 506 that is configured to route data between SEs (or, more precisely, between crossbar switches and CEs in the SEs), a Graph Core 508 and a micro-code Read-Only Memory (μ-ROM) 509.

The SEs 504 comprise CUs, each CU comprising ALUs and a Crossbar switch. The CUs perform primitive low-level cryptographic functions on 8-bit data.

μ-ROM 509 breaks Macro-operations (e.g., AES, DES, SHA) into microoperations; The Graph Core runs graph algorithms according to the micro-operations and orchestrates data movement and tessellation of multiple, simultaneous, cryptographic kernels onto the SEs.

In embodiments, Graph Processor 510 is a hierarchical streaming graph processor like Graph Core 300 (FIG. 3). The Graph-Core executes a plurality of graph algorithms to efficiently allocate CEs to security tasks, to program the ALUs and the crossbar switches, and to control the interconnect circuit. In some embodiments, a graph core is more efficient in handling graph algorithms than other types of CPUs, because it is optimized for the task of taking simple decisions based on comparison and traversing the graph accordingly.

In embodiments, the graph cores are able to handle the communication of relatively large number of decision circuits. The handling of such large amounts of tightly-coupled interconnected communication is not typical of CPUs, DPUs, or vector processors. This is key for the efficient execution of graph algorithms, which rely on information from many edges/vertices of the working graph. In an embodiment, the arbitrary scale and interconnection of vertices within a graph core is vastly different to interconnection of a CPUs (and by extension DPUs, since DPUs incorporate CPUs) register file (typically banked in high-speed registers, where arguments are output from the register file to a CPUs ALUs, and the result of the ALU is output back into the register file). Vector processors, on the other hand, take a plurality of data (vectors) typically from a register file similar to a CPU and perform a single instruction on the data. The graph core takes a plurality of vertex values from an arbitrarily interconnected pool of vertices, and performs multiple instructions on them, to accelerate graph algorithms.

According to the example embodiment illustrated in FIG. 5, the tasks include a Dependency Evaluation algorithm, 510, which analyzes inter-task dependencies and describes the dependencies between the operations in the instruction stream; a micro-operation Fusion algorithm 512, which reviews the instruction streams and combines operations for execution by the ALUs, a Tessellation algorithm 514, which efficiently distributes that tasks in neighboring CEs, and a Data Orchestration task 516, which moves data between CEs, through the crossbar switches and through the interconnect circuit 506. A microcode Read Only Memory (ROM) 518 preprograms Graph Core 508, breaking macro-instructions (e.g., AES, DES) to micro-instructions that are handled by suitable graph algorithms (algorithms 510, 512, 514 and 516 are executed by the graph-core; ROM 518 may be reprogrammed "in the field" if improved methods of performing the macro-instruction algorithms (e.g., AES) are developed).

A Core Frontend 524 comprises additional graph-cores to execute graph algorithms for protocol-agnostic parsing.

Processor Security Extension 500 further comprises interface circuitry that interface with the processor, a Memory Management Units (MMUs) interface 526, which interfaces with the processor's MMUs to allow for pooling of data and operands which do not fit within the memory space of the secure streaming processor instance, and a Core Backend Interface 530, which, in conjunction with the Frontend 524 provide the necessary input/output capabilities, such as insertion of computation results within the secure streaming processor back into the protocol-agnostic data stream, allowing for communication between the secure streaming processor and interconnection interfaces, such as those shown in FIG. 4.

The configuration of Processor Security Extension 500, illustrated in FIG. 5 and described hereinabove is cited by way of example. Other configurations may be used in alternative embodiments. For example, in some embodiments, the security tasks of the processor are executed by a plurality of SSPs, each with separate SEs, Graph-Core and Interconnect circuit (much like the NoC security extension 400, FIG. 4).

Figure 6:
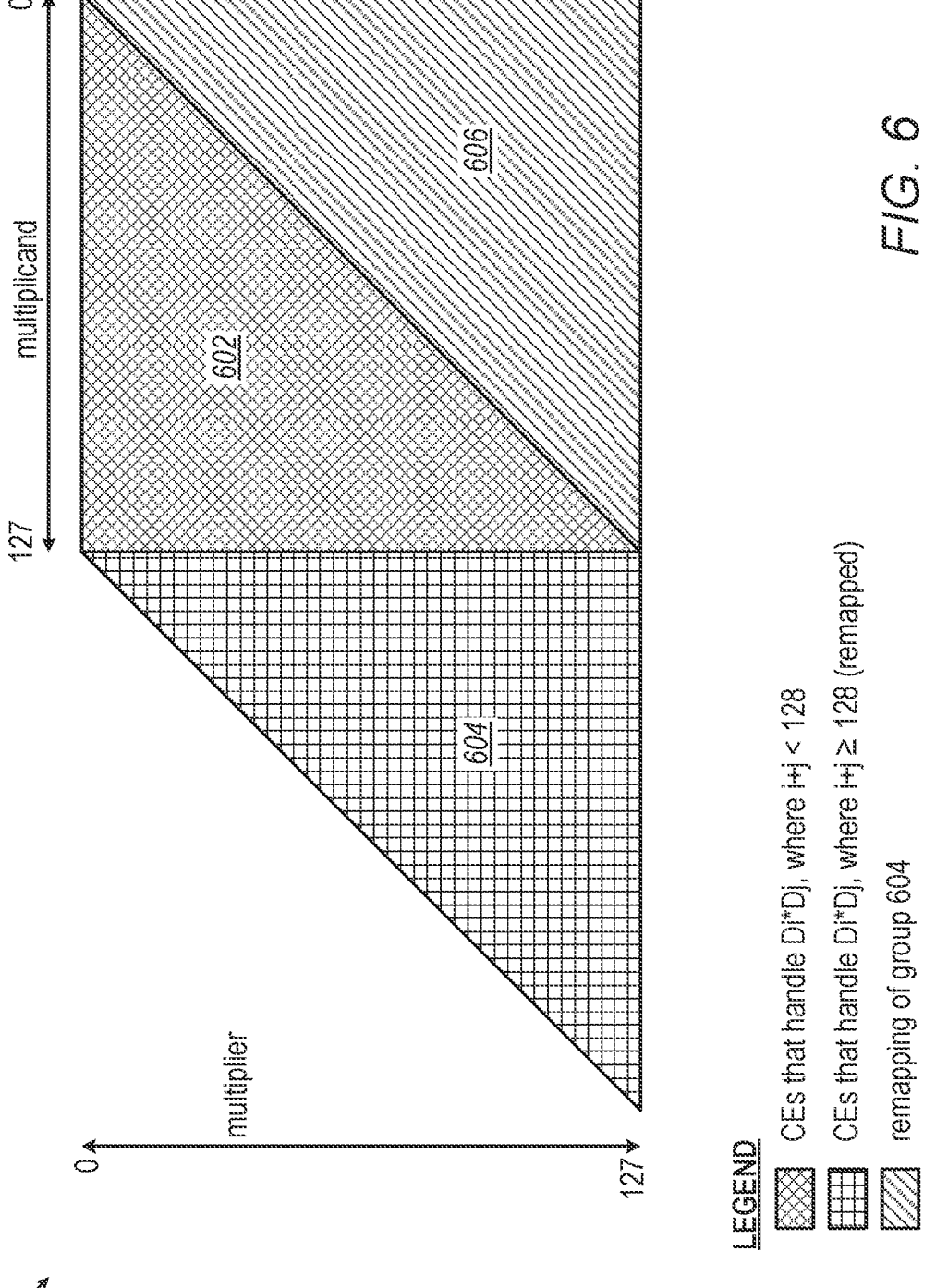
FIG. 6 is a tessellation map that schematically illustrates Compute Unit (CU) utilization in a 128-bit Galois-Field (GF) Multiplication, in accordance with an embodiment that is disclosed herein.

FIG. 6 is a tessellation map that schematically illustrates CU utilization in a 128-bit Galois-Field (GF) Multiplication, in accordance with an embodiment that is disclosed herein. The mapping allows an efficient use of the CUs in the SE; in embodiments, this may reduce the number of CUs and the communication requirements (i.e., inter-CU), saving silicon area and power consumption.

GF multiplication is a carry-less bit-wise multiplication, followed by a modulo operation. For the example 128-bit GF128, a first addition requires $\log 2(64){=}5$ XOR reductions (after operand shift, and assuming a $32{\rightarrow}16{\rightarrow}8{\rightarrow}4{\rightarrow}2{\rightarrow}1$ XOR tree); in embodiments, other GF128 configurations may be used.

With good mapping, the Graph Core will allow operating on sparse rows, with the maximum density column requiring five XOR operations (In some embodiments, a sub-optimal mapping may be selected, allowing a trade-off between optimizing the utilization of the CU hardware, and the mapping graph algorithm runtime).

A Zone 602 illustrates the location of the CUs that are allocated to bit-wise multiplication of multiplicand bits i and multiplier bits j, wherein i+j<128. A Zone 604 illustrates the location of the CUs allocated to the multiplication of multiplicand bits i and multiplier bits j wherein i+j≥128.

Zone 604 is sparse; in embodiment, the Graph Processor maps Zone 604 to Zone 606, allowing a smaller number of better utilized CUs.

FIG. 7 is a flowchart 700 that schematically illustrates a method for streamlined processing of security functions, in accordance with an embodiment that is disclosed herein. The flowchart is executed by SSP 100 (FIG. 1) and, specifically, by ALUs 106, Crossbar Switches 108, Interconnect Circuit 110 and Graph Core 112 (all illustrated in FIG. 1).

The flowchart starts at a Route Operands operation 702, wherein the SSP routes operands to the ALUs. The operands are routed through the crossbar switches and/or through the Interconnect circuit, from other ALUs or, for some CUS, from the edge of the SSP (e.g., from the SSP external interface). The routing is determined by the Graph Core, which runs preset graph algorithms.

Next at a Send Opcodes operation 704, the Graph Core sends opcodes to the ALUs. In embodiments, the opcodes specify bit-wise operations that the ALUs performs on two input words, e.g., AND, OR, XOR etc.

The ALUs then, at an Execute-Opcode operation 706, execute the received opcode on the input operands. Lastly, at a Data-Propagate operation 708, data and operands propagate one step in the SSP pipeline; for example, outputs that the ALUs send in operation 706 will reach the inputs of downstream ALUs, through the crossbar switches and/or the Interconnect Circuit, in the next clock cycle.

After operation 708, at the next clock cycle, the flowchart will reenter operation 702, to repeat operation 702 through 708 for the next clock cycle.

It should be noted that the flowchart described above refers to a pipelined circuit—the loop comprising operations 702 through 708 is executed at the same clock cycle (and, in embodiments, the operations are executed concurrently). Typically, in each clock cycle, operations 702 through 708 are performed on a set of inputs that was determined in the previous clock cycle.

We next describe an example security operation, with reference to FIGS. 4, 5, 6 and 7, in which an Ethernet frame from an Ethernet MAC is hashed using a cryptographic hashing function such as GHASH (the authentication used in Advanced Encryption System Galois Counter Mode (AES-GCM) within IEEE 802.1AE).

Core Frontend 520 routes data (after the Frontend 520 parses the ethernet data from the ETH MAC (FIG. 4) and determines where the additional authenticated data (AAD) and Text (payload) of the ethernet frame are located), through interconnect 506 to optimal locations in SEs 504. The optimal locations are determined by operations required for GHASH from the uROM 509 and the graph algorithms running on Graph Core 508 functions 510, 512, 514, and 516.

Once the data reaches the streaming engines, the method described in flowchart 700 takes place, whereby the GHASH algorithm requires performing GF128 multiplication steps described in FIG. 6 on the compute units (along with other operations not described here, but which are possible to perform on the SSP). The SEs then send the result back through the interconnect 506 and into the Core Backend 530, which inserts the result hash value into the ethernet frame.

The configuration of SSP system 100, SE 102, Interconnect Circuit 110 (all in FIG. 1) and Graph Core 300 (FIG. 3), Tessellation Map 600 (FIG. 6); and the method of flowchart 700 (FIG. 7) are example configurations, maps and methods that are shown purely for the sake of conceptual clarity. Any other suitable configurations and methods can be used in alternative embodiments.

In various embodiments, SSP system 100, including any or all sub-units thereof, may be carried out by hardware, by software, or by combination of hardware and software.

In various embodiments, SSP 100 may be implemented using suitable hardware, such as one or more Application-Specific Integrated Circuits (ASIC) or Field-Programmable Gate Arrays (FPGA), or a combination of ASIC and FPGA.

Although the embodiments described herein mainly address streaming security processors, the methods and systems described herein can also be used in other general purpose computing applications.

It is thus noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing system, comprising:
a streaming engine, comprising:
an array of compute units (CUs) configured to perform logical operations on operands;
an array of crossbar switches in communication with the CUs, the crossbar switches configured to forward outputs of one or more of the CUs in the array to inputs of one or more neighboring CUs in the array; and
a configurable interconnect circuit, configured to forward an output of at least one of the CUs to an input of at least one of the crossbar switches; and
a graph core, configured to program the streaming engine to perform a security computation by (i) selectively configuring the CUs to perform a plurality of respective logical operations in a programmable order to define a flow of logical operations to be performed by the CUs that effects the security computation, and (ii) configuring the crossbar switches and the interconnect circuit to perform the logical operations by traversing the CUs according to the flow.

2. The computation system according to claim 1, wherein, subsequent to being programmed by the graph core, the engine is configured to execute multiple instances of the security computation in a pipeline on multiple respective input data.

3. The computing system according to claim 1, wherein the CUs are grouped in tiles, each tile comprising a respective subset of the CUs and a respective subset of the crossbar switches.

4. The computing system according to claim 3, wherein a given tile comprises circuitry configured to forward a given input, received via the interconnect circuit, to a given crossbar switch in the given tile.

5. The computing system according to claim 1, wherein the graph core comprises an array of interconnected graph decision circuits, a given graph decision circuit comprising a High-Radix switch.

6. The computing system according to claim 5, wherein the given graph decision circuit further comprises a digital comparator configured to compare two or more outputs of the High-Radix switch to one another.

7. The computing system according to claim 1, wherein the graph core is configured to divide the security computation into multiple computational tasks, to define a flow of data between the computational tasks, and to map the computation tasks to at least some of the CUs.

8. The computing system according to claim 7, wherein the graph core is configured to map the computational tasks to the CUs in accordance with a space-filling curve.

9. A computing method, comprising:
performing logical operations on operands using a streaming engine comprising an array of compute units (CUs);

using an array of crossbar switches in communication with the CUs, forwarding outputs of one or more of the CUs in the array to inputs of one or more neighboring CUs in the array;

using a configurable interconnect circuit, forwarding an output of at least one of the CUs to an input of at least one of the crossbar switches; and using a graph core, programming the streaming engine, the array of crossbar switches and the interconnect circuit to perform a security computation by (i) selectively configuring the CUs to perform a plurality of respective logical operations in a programmable order to define a flow of logical operations to be performed by the CUs that effects the security computation, and (ii) configuring the crossbar switches and the interconnect circuit to perform the logical operations by traversing the CUs according to the flow.

10. The computation method according to claim 9, further comprising, subsequent to programming by the graph core, executing multiple instances of the security computation in a pipeline on multiple respective input data.

11. The computing method according to claim 9, wherein performing the logical operations and forwarding the outputs comprises applying CUs that are grouped in tiles, each tile comprising a respective subset of the CUs and a respective subset of the crossbar switches.

12. The computing method according to claim 11, wherein forwarding the outputs comprises, in a given tile, forwarding a given input, received via the interconnect circuit, to a given crossbar switch in the given tile.

13. The computing method according to claim 9, wherein programming the streaming engine, the array of crossbar switches and the interconnect circuit comprises applying an array of interconnected graph decision circuits in the graph core, a given graph decision circuit comprising a High-Radix switch.

14. The computing method according to claim 13, wherein applying the given graph decision circuit further comprises applying a digital comparator to compare two or more outputs of the High-Radix switch to one another.

15. The computing method according to claim 9, wherein programming the streaming engine, the array of crossbar switches and the interconnect circuit comprises dividing the security computation into multiple computational tasks, defining a flow of data between the computational tasks, and mapping the computation tasks to at least some of the CUs.

16. The computing method according to claim 15, wherein mapping the computational tasks to the CUs comprises applying a space-filling curve.

* * * * *